US008826083B2

(12) United States Patent  (10) Patent No.: US 8,826,083 B2
Yamasaki et al.  (45) Date of Patent: Sep. 2, 2014

(54) INFORMATION PROCESSING APPARATUS, INFORMATION PROCESSING METHOD, IMAGE FORMING APPARATUS, IMAGE FORMING METHOD, AND COMPUTER READABLE MEDIUM

(75) Inventors: Naoya Yamasaki, Kanagawa (JP); Matsuyuki Aoki, Kanagawa (JP); Shunichiro Shishikura, Kanagawa (JP); Toru Iwanami, Kanagawa (JP); Kenjo Nagata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 355 days.

(21) Appl. No.: 13/366,035

(22) Filed: Feb. 3, 2012

(65) Prior Publication Data

US 2013/0019128 A1 Jan. 17, 2013

(30) Foreign Application Priority Data

Jul. 12, 2011 (JP) ................................ 2011-153856

(51) Int. Cl.
 *G06F 11/00* (2006.01)
 *G06F 11/07* (2006.01)
(52) U.S. Cl.
 CPC ........ *G06F 11/0733* (2013.01); *G06F 11/0775* (2013.01); *G06F 11/0781* (2013.01); *G06F 11/0787* (2013.01)
 USPC ........................................... 714/45; 358/1.14
(58) Field of Classification Search
 CPC .......................... G06F 11/0766; G06F 11/3476
 USPC ........................................... 358/1.14; 714/45
 See application file for complete search history.

(56) References Cited

U.S. PATENT DOCUMENTS

| 5,512,979 | A * | 4/1996 | Ogura ................................ 399/8 |
| 7,613,404 | B2 * | 11/2009 | Takeuchi et al. .................. 399/8 |
| 7,817,293 | B2 * | 10/2010 | Boyd et al. ..................... 358/1.15 |
| 8,503,003 | B2 * | 8/2013 | Kurahashi ..................... 358/1.14 |
| 8,564,818 | B2 * | 10/2013 | Nakamura ..................... 358/1.15 |
| 2002/0194214 | A1 * | 12/2002 | Fukazawa ...................... 707/500 |
| 2006/0085697 | A1 * | 4/2006 | Takeuchi et al. ................ 714/50 |
| 2007/0113692 | A1 | 5/2007 | Yasukawa et al. |
| 2009/0119548 | A1 * | 5/2009 | Kollmann et al. .............. 714/45 |
| 2009/0237741 | A1 * | 9/2009 | Kurahashi ..................... 358/406 |
| 2012/0293825 | A1 * | 11/2012 | Ishii ............................. 358/1.14 |

FOREIGN PATENT DOCUMENTS

| JP | 2001-228761 A | 8/2001 |
| JP | 2004-093896 A | 3/2004 |
| JP | 2005-033559 A | 2/2005 |
| JP | 2005-173088 A | 6/2005 |
| JP | 2009-069530 A | 4/2009 |

* cited by examiner

*Primary Examiner* — Joshua P Lottich
(74) *Attorney, Agent, or Firm* — Sughrue Mion, PLLC

(57) ABSTRACT

An information processing apparatus includes an acquiring unit that acquires diagnosis information regarding an operating condition of an image forming apparatus that forms an image, a communication connection unit that establishes a communication connection with the image forming apparatus and a management server via a communication line, a storage controller that stores the diagnosis information acquired by the acquiring unit in a predetermined memory, where the storage controller reduces a data amount of the diagnosis information stored when a communication connection is not established to less than that stored when a communication connection is established, and a transmitting unit that transmits the diagnosis information stored in the memory to the management server if a communication connection is established by the communication connection unit.

15 Claims, 11 Drawing Sheets

INFORMATION PROCESSING APPARATUS, INFORMATION PROCESSING METHOD, IMAGE FORMING APPARATUS, IMAGE FORMING METHOD, AND COMPUTER READABLE MEDIUM

CROSS-REFERENCE TO RELATED APPLICATIONS

This application is based on and claims priority under 35 USC 119 from Japanese Patent Application No. 2011-153856 filed Jul. 12, 2011.

BACKGROUND

Technical Field

The present invention relates to an information processing apparatus, an information processing method, an image forming apparatus, an image forming method, and a computer readable medium.

SUMMARY

According to an aspect of the invention, there is provided an information processing apparatus including an acquiring unit that acquires diagnosis information regarding an operating condition of an image forming apparatus that forms an image, a communication connection unit that establishes a communication connection with the image forming apparatus and a management server via a communication line, a storage controller that stores the diagnosis information acquired by the acquiring unit in a predetermined memory, where the storage controller reduces a data amount of the diagnosis information stored when a communication connection is not established to less than a data amount of the diagnosis information stored when a communication connection is established, and a transmitting unit that transmits the diagnosis information stored in the memory to the management server if a communication connection is established by the communication connection unit.

BRIEF DESCRIPTION OF THE DRAWINGS

Exemplary embodiments of the present invention will be described in detail based on the following figures, wherein.

DETAILED DESCRIPTION

First Exemplary Embodiment

Configuration

Figure 1:
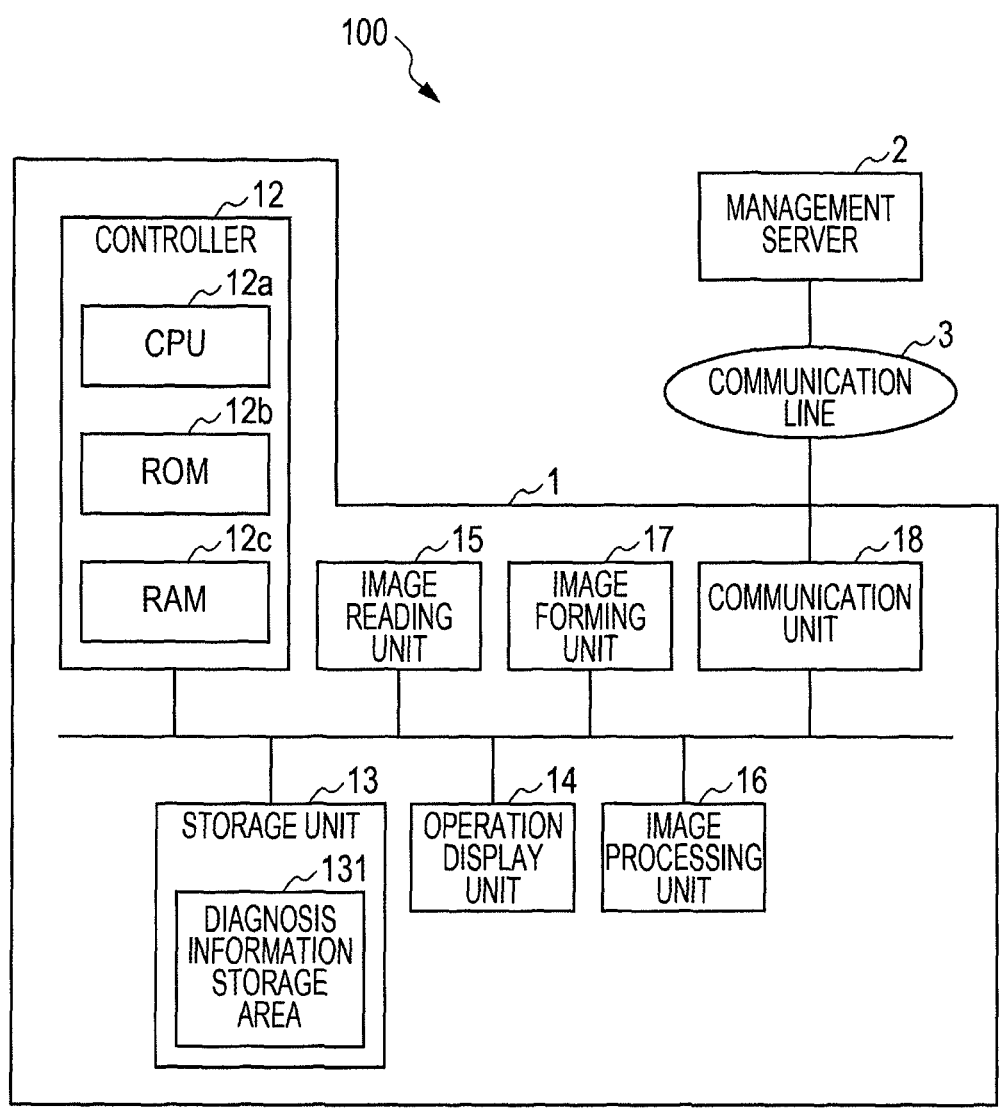
FIG. 1 is a block diagram illustrating an example of the configuration of a maintenance management system according to a first exemplary embodiment.

FIG. 1 is a block diagram illustrating an example of the configuration of a maintenance management system 100 according to an exemplary embodiment of the invention. As illustrated in FIG. 1, the maintenance management system 100 includes an image forming apparatus 1 and a management server 2 connected to each other via a communication line 3, such as a wide area network (WAN) or a public line so as to communicate with each other. The image forming apparatus 1 is an example of an image forming apparatus according to the present invention. The image forming apparatus 1 has an image forming function of forming an image on a recording medium, such as a sheet of paper, using data transmitted from a different computer apparatus (e.g., a personal computer), a copy function of copying an image, and a scan function of reading an image formed on a recording medium. However, the functions of the image forming apparatus 1 are not limited thereto. For example, the image forming apparatus 1 may have a facsimile function. In addition, the image forming apparatus 1 is not limited to an image forming apparatus having all of the above-described functions. For example, the image forming apparatus 1 may have only the copy function without the other functions. Furthermore, the recording medium on which the image forming apparatus 1 forms an image is not limited to a sheet of paper. For example, the sheet may be a transparent synthetic resin sheet, such as an overhead projector (OHP) sheet, or a sheet made of another material. The management server 2 stores information used for a maintenance operation performed by the image forming apparatus 1 (hereinafter referred to as "diagnosis information". The management server 2 is an example of a management server according to the present invention. The management server 2 receives diagnosis information transmitted from the image forming apparatus 1 and stores the received diagnosis information in a predetermined storage unit. In addition, the management server 2 analyzes the diagnosis information.

An exemplary hardware configuration of the image forming apparatus 1 is described next with reference to FIG. 1. As illustrated in FIG. 1, units of the image forming apparatus 1 are connected to a bus 11 and communicate data with one another via the bus 11. In FIG. 1, a controller 12 includes a central processing unit (CPU) 12a, a read only memory (ROM) 12b, and a random access memory (RAM) 12c. The controller 12 performs overall control of the image forming apparatus 1 in accordance with a computer program stored in the ROM 12b or a storage unit 13. The controller 12 is an example of an information processing apparatus according to the present invention. An example of the storage unit 13 is a hard disk. The storage unit 13 stores a variety of programs including the program for controlling the image forming apparatus 1. An operation display unit 14 includes a liquid crystal display functioning as a touch panel. A user of the image forming apparatus 1 performs a variety of operations by touching the liquid crystal display. A communication unit 18 is connected to the communication line 3 using a communication cable. The communication unit 18 communicates data with the management server 2 connected to the communication line 3.

An image reading unit 15 includes an optical member (not illustrated). The image reading unit 15 optically reads an image of a document and generates image data representing the read image. An image processing unit 16 performs a variety of image processes, such as color correction and grayscale correction, on the image represented by the input image data. Thus, the image processing unit 16 generates, from the image data subjected to the image processes, yellow (Y) image data, magenta (M) image data, cyan (C) image data, and black (K) image data. Thereafter, the image processing unit 16 performs a screen process on the generated image data and outputs the image data to an image forming unit 17. The image processing unit 16 is formed from an integrated circuit, such as an application specific integrated circuit (ASIC).

The image forming unit 17 forms an image on a recording medium, such as a sheet of paper. According to the present exemplary embodiment, the image forming unit 17 forms an image on a recording medium using an electrophotographic technique. The image forming unit 17 forms Y, M, C, and K toner images on the basis of the Y, M, C, and K color image data generated by the image processing unit 16 and transfers the toner images onto a sheet of paper and fixes the toner images to the sheet. In this way, the image forming unit 17 forms an image on the sheet.

The storage unit 13 has a diagnosis information storage area 131 for storing the diagnosis information used for maintenance of the image forming apparatus 1. The diagnosis information has an identifier indicating the type of diagnosis information assigned thereto. The diagnosis information includes at least one parameter. According to the present exemplary embodiment, the diagnosis information falls in one of the following types: failure occurrence information, warning information, consumable information, and usage status information. If some failure (an abnormal condition) occurs in the image forming apparatus 1, the failure occurrence information provides information regarding the failure. If a user is to be alerted using a warning message indicating that some event occurs in the image forming apparatus 1, the warning information provides information regarding the event. The consumable information is information regarding the consumable, such as the amount of remaining toner and the number of rotation of the photoconductor drum. The usage status information is information used for recognizing the usage status of the apparatus. More specifically, the usage status information includes the number of output sheets, the number of sheets output from each paper feed tray, the sheet size, the image density, the monitor values output from various sensors, and the image formation condition control values. The failure occurrence information and the warning information are generated each time a failure or an event to be alerted occurs. In contrast, the consumable information and the usage status information are generated at a predetermined point in time (e.g., once every predetermined period of time or once every processing unit) and are stored in the diagnosis information storage area 131.

Figure 2:
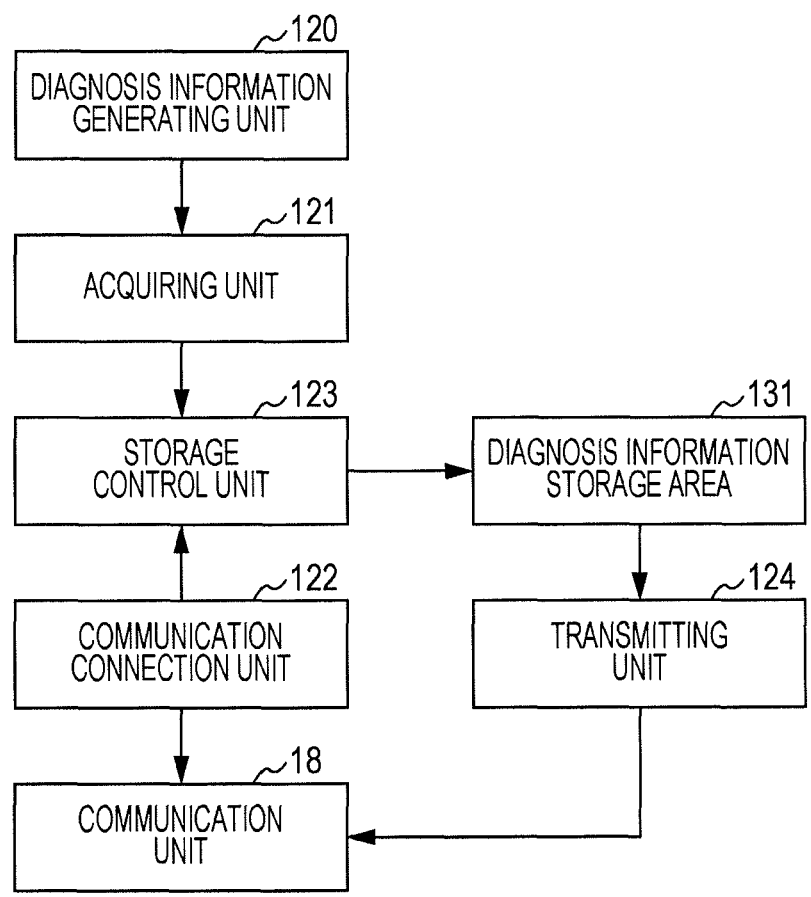
FIG. 2 is a block diagram of an exemplary functional configuration of an image forming apparatus.

An exemplary functional configuration of the image forming apparatus 1 is described next with reference to the accompanying drawings. FIG. 2 is a block diagram of an exemplary functional configuration of the image forming apparatus 1. As illustrated in FIG. 2, each of a diagnosis information generating unit 120, an acquiring unit 121, a communication connection unit 122, a storage control unit 123, and a transmitting unit 124 is realized by the controller 12 that reads the computer program stored in the ROM 12b or the storage unit 13 and executes the computer program. Note that an arrow in FIG. 2 schematically illustrates a direction in which the data flows. In FIG. 2, the diagnosis information generating unit 120 generates diagnosis information including the operating condition information regarding the image forming apparatus 1. More specifically, the diagnosis information generating unit 120 generates diagnosis information used for performing maintenance management of the image forming apparatus 1, such as diagnosis information indicating the amount of remaining toner generated once every predetermined unit time and diagnosis information indicating the location at which a paper jam occurs and the point in time at which the paper jam occurs. The acquiring unit 121 acquires the diagnosis information generated by the diagnosis information generating unit 120. The acquiring unit 121 is an example of an acquiring unit according to the present invention. The communication connection unit 122 communicates with the management server 2 via the communication line 3. The communication connection unit 122 is an example of a communication connection unit according to the present invention.

The storage control unit 123 stores the diagnosis information acquired by the acquiring unit 121 in the diagnosis information storage area 131. The storage control unit 123 is an example of a storage controller according to the present invention. The storage control unit 123 determines whether a communication connection is established by the communication connection unit 122. If the determination is "No", the storage control unit 123 reduces the data amount of the diagnosis information stored in the diagnosis information storage area 131 to less than the data amount stored when the determination is "Yes". This determination may be made by the storage control unit 123 referring to a flag provided in the image forming apparatus 1. Alternatively, this determination may be dynamically made by transmitting a command for determining whether a communication connection is established (e.g., a ping command). That is, any technique for determining whether a communication connection with the image forming apparatus 1 is established can be used.

If a communication connection is established by the communication connection unit 122, the transmitting unit 124 transmits, to the management server 2, the diagnosis information stored in the diagnosis information storage area 131 via the communication line 3 at a predetermined point in time (e.g., at predetermined intervals or at a time at which a predetermined condition is satisfied). The transmitting unit 124 is an example of a transmitting unit according to the present invention.

Example 1 of Operation

An example of the operation performed by the controller 12 of the image forming apparatus 1 is described next with reference to a flowchart illustrated in FIG. 3. In this example of the operation, when the controller 12 stores the diagnosis information in the diagnosis information storage area 131 and if a communication connection is not established, the controller 12 counts the acquired diagnosis information for each of the types indicated by the identifier. Thereafter, the controller 12 performs control so as not to store, in the diagnosis information storage area 131, the diagnosis information having a type for which the count of acquisition is less than a predetermined threshold value.

Figure 3:
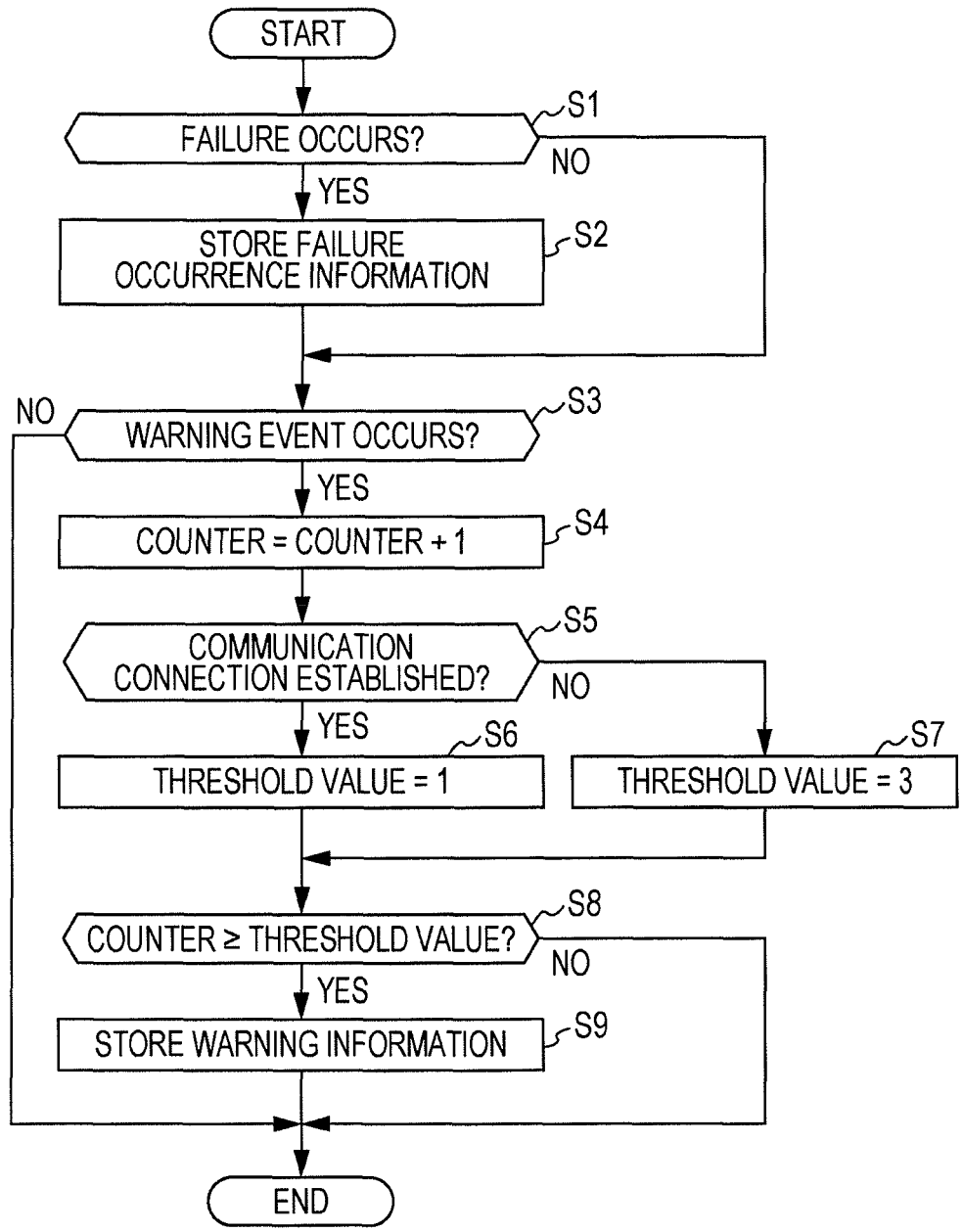
FIG. 3 is a flowchart of an exemplary operation performed by a controller of the image forming apparatus.

As illustrated in FIG. 3, the controller 12 determines whether a failure (an abnormal event) occurs (step S1). If it is determined that a failure occurs ("YES" in step S1), the controller 12 generates diagnosis information regarding the failure (failure occurrence information) and stores the generated diagnosis information in the diagnosis information storage area 131 (step S2). However, if, in step S1, it is determined that a failure does not occur ("NO" in step S1), the processing performed by the controller 12 proceeds to step S3 (step S2 is skipped).

Subsequently, the controller 12 determines whether an event to be warned (hereinafter referred to as a "warning event") occurs in the image forming apparatus 1 (step S3). If it is determined that a warning event does not occur ("NO" in step S3), the processing is completed. However, if it is determined that a warning event occurs ("YES" in step S3), the controller 12 increments a counter for the type of warning event by one (step S4). Thereafter, the controller 12 determines whether a communication connection is established (step S5). If a communication connection is established ("YES" in step S5), the controller 12 sets a threshold value to "1" (step S6). However, if a communication connection is not established ("NO" in step S5), the controller 12 sets the threshold value to "3" (step S7). Thereafter, the controller 12 determines whether the counter value is greater than or equal to the threshold value (step S8). If the counter value is greater than or equal to the threshold value ("YES" in step S8), the controller 12 stores, in the diagnosis information storage area 131, the diagnosis information (the warning information) regarding the warning event which occurs in the image forming apparatus 1 (step S9).

That is, according to the present exemplary embodiment, each time an event to be warned occurs, the diagnosis information regarding the event is stored. In such a case, if a communication connection is not established, the diagnosis information is stored once every three occurrences of the event to be warned. By doing so, the data amount of the diagnosis information stored in the diagnosis information storage area 131 can be reduced to less than that stored when a communication connection is established.

While the example illustrated in FIG. 3 has been described with reference to the controller 12 that stores warning information if an event to be warned occurs three times or more, the present invention is not limited thereto. For example, the warning information may be stored once every three times. In addition, stored information is not limited to warning information. The same operation may be applied to the failure occurrence information. That is, when a communication connection is not established and if a failure occurs a predetermined number of times or more, the failure occurrence information may be stored. That is, control can be performed so that if a communication connection is not established, the controller 12 stores diagnosis information in the diagnosis information storage area 131 less frequently than it does when a communication connection is established.

Example 2 of Operation

Figure 4:
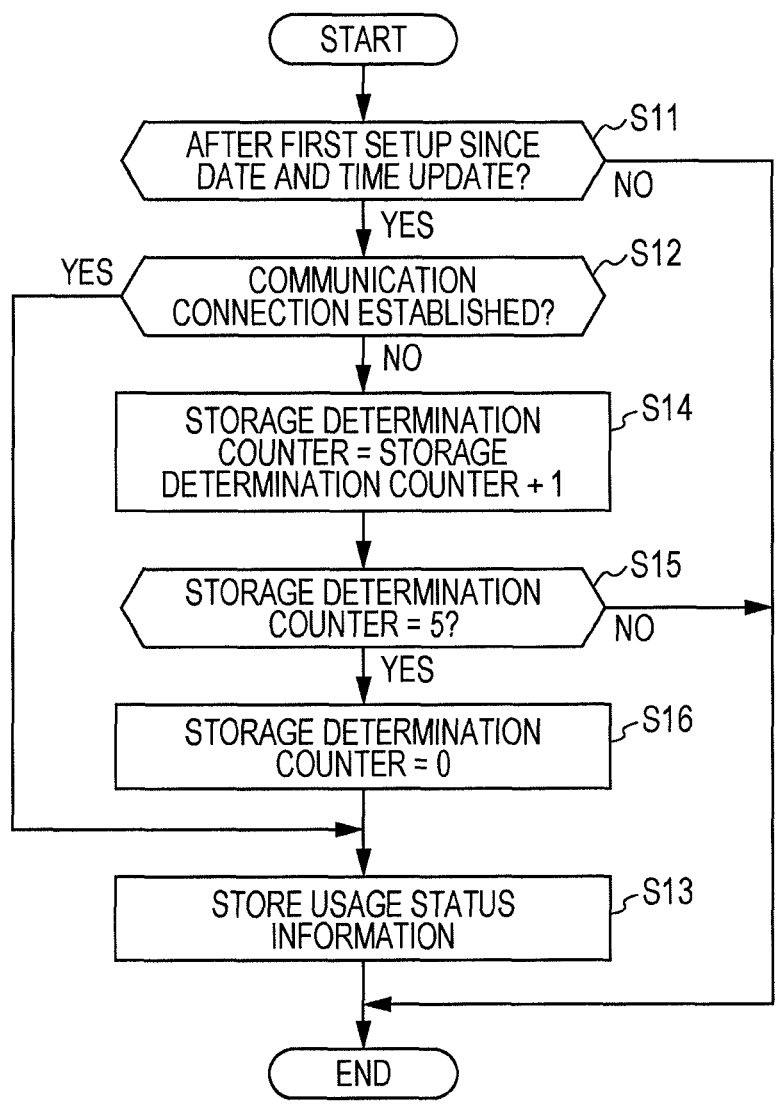
FIG. 4 is a flowchart of a process performed by the controller of the image forming apparatus.

An example of the storage control process performed for the usage status information is described next with reference to a flowchart illustrated in FIG. 4. As illustrated in FIG. 4, the controller 12 determines whether first setup has been completed since the date and time was updated (step S11). This determination is made by, for example, referring to a flag provided in the image forming apparatus 1. If the determination is "No" ("NO" in step S11), the controller 12 completes its processing without storing the usage status information. However, if the determination is "Yes" ("YES" in step S11), the controller 12 determines whether a communication connection is established (step S12). If a communication connection is established ("YES" in step S12), the controller 12 accumulates (stores) the generated usage status information in the diagnosis information storage area 131 (step S13).

However, if a communication connection is not established, the controller 12 increments a storage determination counter by one (step S14). Thereafter, the controller 12 determines whether the value of the storage determination counter reaches a predetermined threshold value ("5" in the example illustrated in FIG. 4) (step S15). If the value of the storage determination counter reaches the predetermined threshold value ("YES" in step S15), the controller 12 sets the value of the storage determination counter to "0" (step S16) and stores the usage status information in the diagnosis information storage area 131 (step S13). However, if the value of the storage determination counter does not reach the predetermined threshold value ("NO" in step S15), the controller 12 completes its processing without performing the process in step S13. That is, in the example of operation, if a communication connection is established, the controller 12 stores all of the usage status information items in the diagnosis information storage area 131. However, if a communication connection is not established, the controller 12 stores the usage status information item once every five times.

Example 3 of Operation

Another example of the present exemplary embodiment is described next with reference to a flowchart illustrated in FIG. 5. In this example of operation, when storing the diagnosis information in the diagnosis information storage area 131 and if a communication connection is not established, the controller 12 counts the number of acquired diagnosis identification items for each of the types of information indicated by the identifier. At that time, if the number of the acquired diagnosis information items of one of the types is greater than or equal to a predetermined threshold value, the controller 12 overwrites the diagnosis information item of this type previously stored in the diagnosis information storage area 131 with the newly acquired diagnosis information item.

The controller 12 determines whether a failure occurs (step S21). If it is determined that a failure does not occur ("NO" in step S21), the controller 12 completes its processing without performing the processes in steps S22 to S27. However, if, in step S21, it is determined that a failure occurs ("YES" in step S21), the controller 12 determines whether a communication connection is established (step S22). When a communication connection is established ("YES" in step S22) and if the diagnosis information storage area 131 has a free space, the controller 12 stores the diagnosis information item regarding the failure in the free space. However, if the diagnosis information storage area 131 does not have a free space, the controller 12 overwrites the diagnosis information item previously stored in the diagnosis information storage area 131 with the newly generated diagnosis information item (step S23).

However, if, in step S22, a communication connection is not established ("NO" in step S22), the controller 12 increments the counter value (step S24). Thereafter, the controller 12 determines whether the counter value is less than or equal to four (step S25). When the counter value is less than or equal to four ("YES" in step S25) and if the diagnosis information storage area 131 has a free space, the controller 12 stores the diagnosis information item regarding the failure in the free space. However, if the diagnosis information storage area 131 does not have a free space, the controller 12 overwrites the diagnosis information items previously stored in the diagnosis information storage area 131 with the newly generated diagnosis information item (step S23). If, in step S25, the counter value is greater than four ("NO" in step S25), the controller 12 overwrites the diagnosis information item previously stored in the diagnosis information storage area 131 and having a type that is the same as the type of the diagnosis information item to be stored with the new diagnosis information item (step S26).

Figure 5:
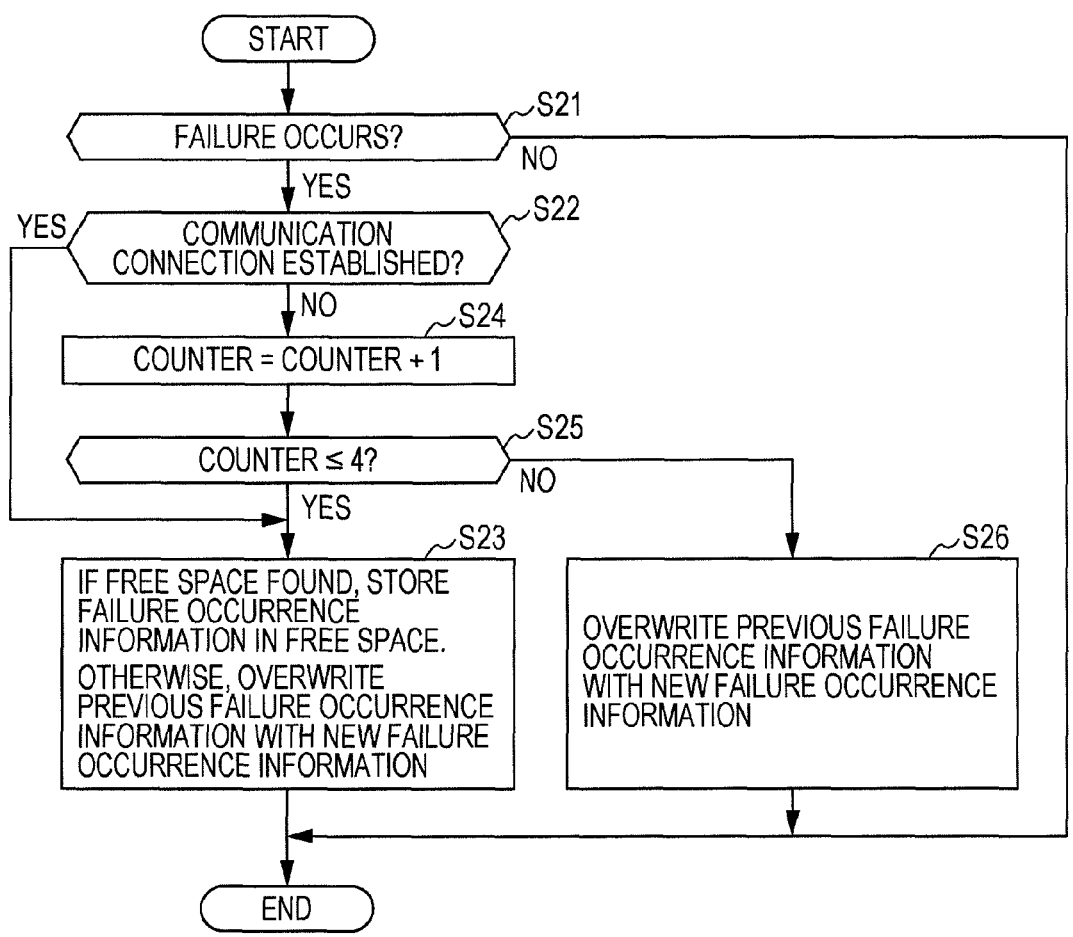
FIG. 5 is a flowchart of a process performed by the controller of the image forming apparatus.

That is, in the example of operation illustrated in FIG. 5, if a communication connection is not established, the number of diagnosis information items to be stored is limited. If the number of stored diagnosis information items exceeds a predetermined number of information items to be stored, the previously stored diagnosis information item having a type that is the same as the type of the new diagnosis information item to be stored is overwritten with the new diagnosis information item. More specifically, for example, if a communication connection is established, all of the generated diagnosis information items are stored. However, if a communication connection is not established, a maximum of four failure occurrence information items and a maximum of two warning information items are stored. In contrast, if the storage area does not have a free space, the previously stored diagnosis information items are sequentially overwritten.

Example 4 of Operation

Another example of the present exemplary embodiment is described next with reference to a flowchart illustrated in FIG. 6. In this example of operation, if a communication connection is not established, the controller 12 stores, in the diagnosis information storage area 131, only a diagnosis identification item including a predetermined identifier. In the example illustrated in FIG. 6, the controller 12 determines whether a failure occurs in the image forming apparatus 1 first (step S31). If it is determined that a failure occurs ("YES" in step S31), the controller 12 stores the failure occurrence information regarding the failure in the diagnosis information storage area 131 (step S32). Subsequently, the controller 12 determines whether an event to be warned occurs in the image forming apparatus 1 (step S33). If it is determined that an event to be warned occurs ("YES" in step S33), the controller 12 stores the warning information regarding the event in the diagnosis information storage area 131 (step S34).

Subsequently, the controller 12 determines whether it is the time to store consumable information (diagnosis information including a predetermined identifier) (step S35). According to the present exemplary embodiment, the timing of storing the consumable information is determined in advance. If the determination is "YES" ("YES" in step S35), the controller 12 determines whether a communication connection is established (step S36). Only when a communication connection is established ("YES" in step S36), the controller 12 stores the consumable information in the diagnosis information storage area 131 (step S37). Thereafter, the controller 12 determines whether it is the time to store usage status information (diagnosis information including a predetermined identifier) (step S38). According to the present exemplary embodiment, the timing of storing the usage status information is determined in advance. If the determination made in step S38 is "YES" ("YES" in step S38), the controller 12 determines whether a communication connection is established (step S39). Only when a communication connection is established ("YES" in step S39), the controller 12 stores the usage status information in the diagnosis information storage area 131 (step S40).

Figure 6:
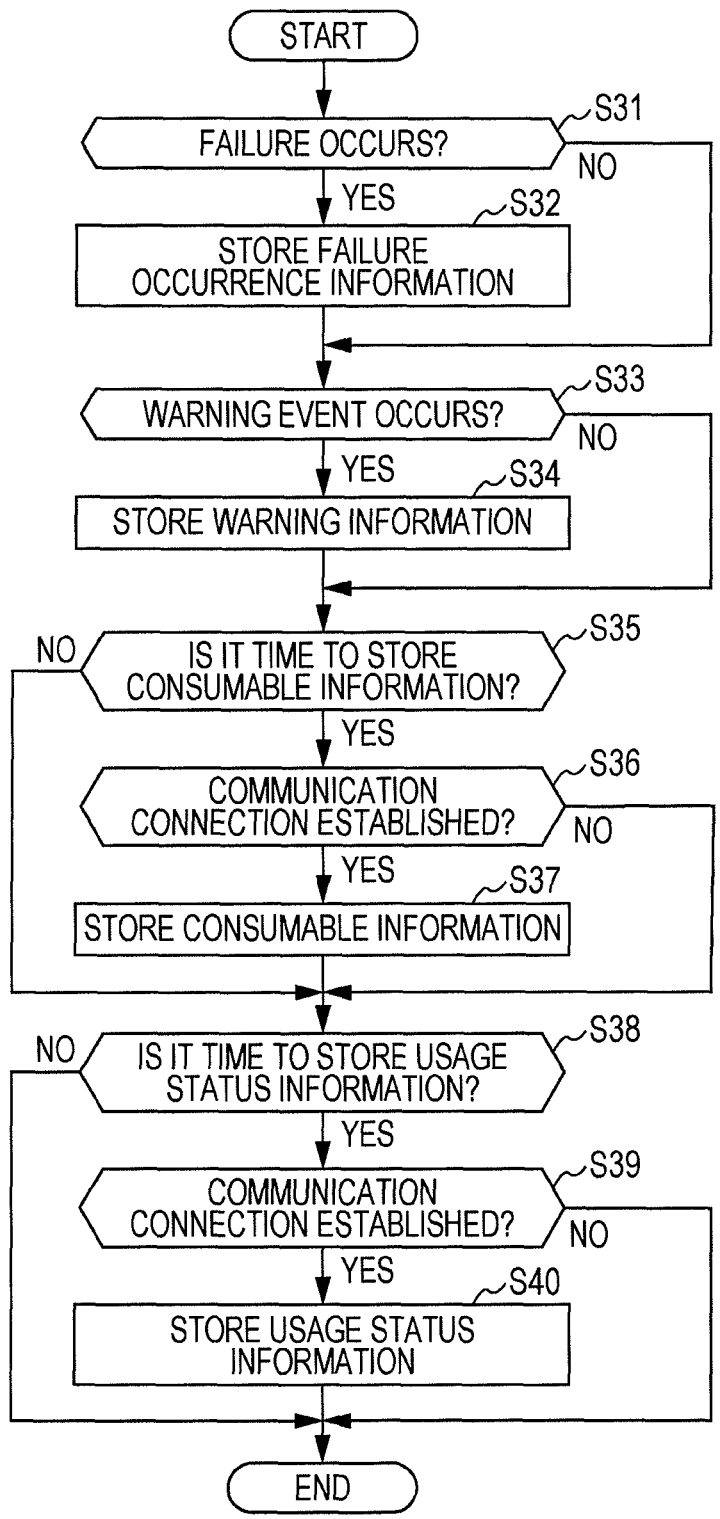
FIG. 6 is a flowchart of a process performed by the controller of the image forming apparatus.

That is, in the example illustrated in FIG. 6, if a communication connection is not established, the controller 12 stores only the diagnosis information having a high priority (i.e., the failure occurrence information and the warning information) and does not store the consumable information and the usage status information. Note that instead of storing the failure occurrence information and the warning information, the controller 12 may store only the failure occurrence information if a communication connection is not established. Alternatively, the controller 12 may perform control so as not to store a consumable information item that is periodically notified but so as to store a consumable information item that is not periodically notified (e.g., the life end value).

Example 5 of Operation

Figure 7:
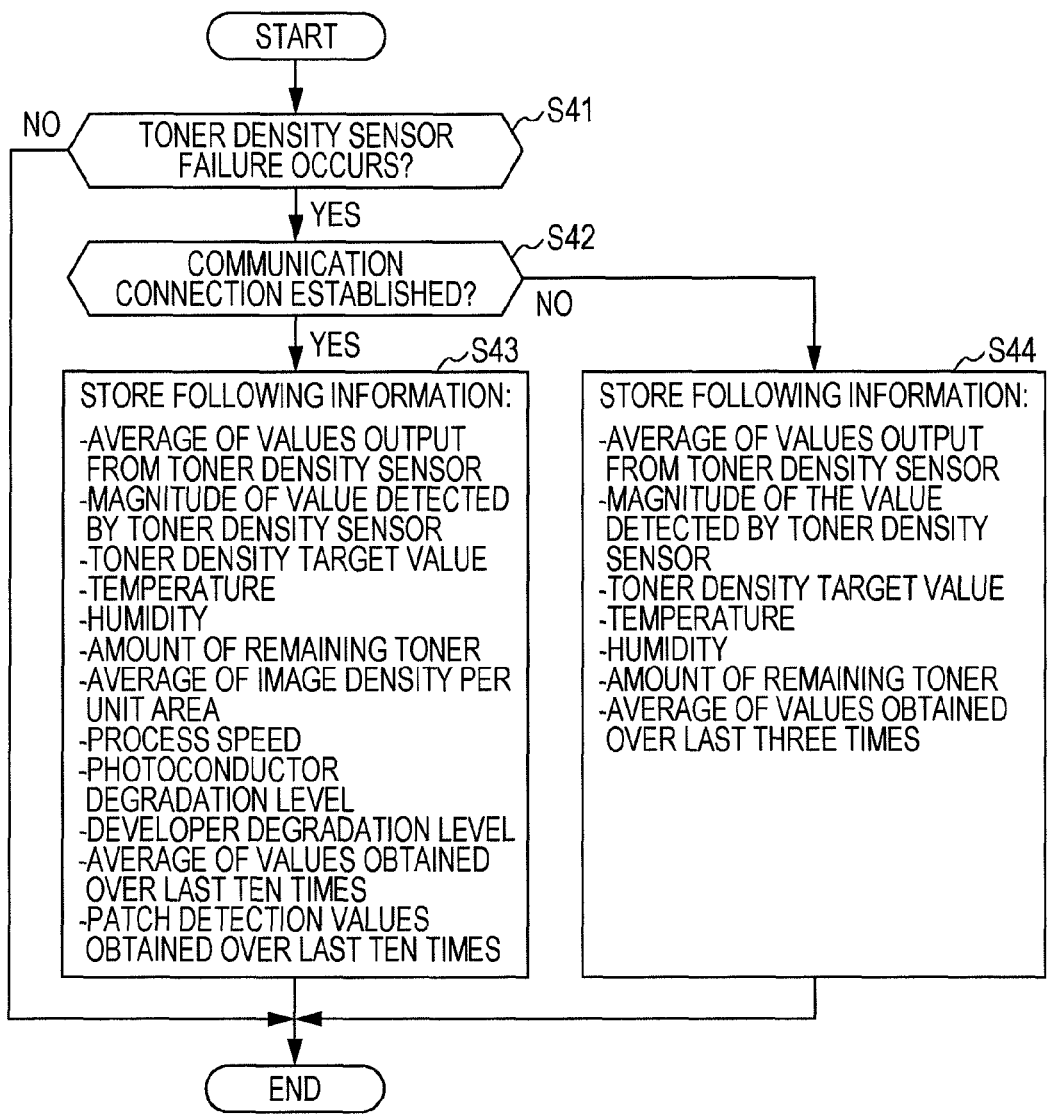
FIG. 7 is a flowchart of a process performed by the controller of the image forming apparatus.

Another example of operation according to the present exemplary embodiment is described next with reference to a flowchart illustrated in FIG. 7. In this example of operation, when the controller 12 stores the diagnosis information in the diagnosis information storage area 131 and if a communication connection is not established, the controller 12 reduces the number of the parameters of the diagnosis information to less than that set when a communication connection is established. The example illustrated in FIG. 7 is described with reference to the control performed by the controller 12 when an abnormal toner density is detected by a toner density sensor (a sensor that senses the toner-to-carrier ratio). At that time, the controller 12 determines whether an abnormal toner density is detected (step S41). If an abnormal toner density is not detected ("NO" in step S41), the controller 12 completes its processing without performing the processes from step S42 to step S44.

However, if, in step S41, an abnormal toner density is detected ("YES" in step S41), the controller 12 determines whether a communication connection is established (step S42). If a communication connection is established, the controller 12 stores, in the diagnosis information storage area 131, diagnosis information including the following parameters: the "average of values output from the toner density sensor", the "magnitude of the value detected by the toner density sensor", the "toner density target value", the "temperature", the "humidity", the "amount of remaining toner", the "average of image density per unit area", the "process speed", the "photoconductor degradation level", the "developer degradation level", the "average of values obtained over last ten times", and the "patch detection values obtained over last ten times" (step S43). However, if a communication connection is not established, the controller 12 stores, in the diagnosis information storage area 131, diagnosis information including the following parameters: the "average of values output from the toner density sensor", the "magnitude of the value detected by the toner density sensor", the "toner density target value", the "temperature", the "humidity", the "amount of remaining toner", and the "average of values obtained over last three times" (step S44). In this way, if a communication connection is not established, the controller 12 of the image forming apparatus 1 reduces the number of parameters of the diagnosis information.

As described above, if a communication connection is not established for the image forming apparatus 1, the controller 12 of the image forming apparatus 1 reduces the data amount of diagnosis information stored in the diagnosis information storage area 131 to less than that stored when a communication connection is established. At that time, in order to reduce the data amount, the controller 12 may perform any one of the processes illustrated in FIGS. 3 to 7. Alternatively, the controller 12 may perform any combination of the processes.

Second Exemplary Embodiment

Figure 8:
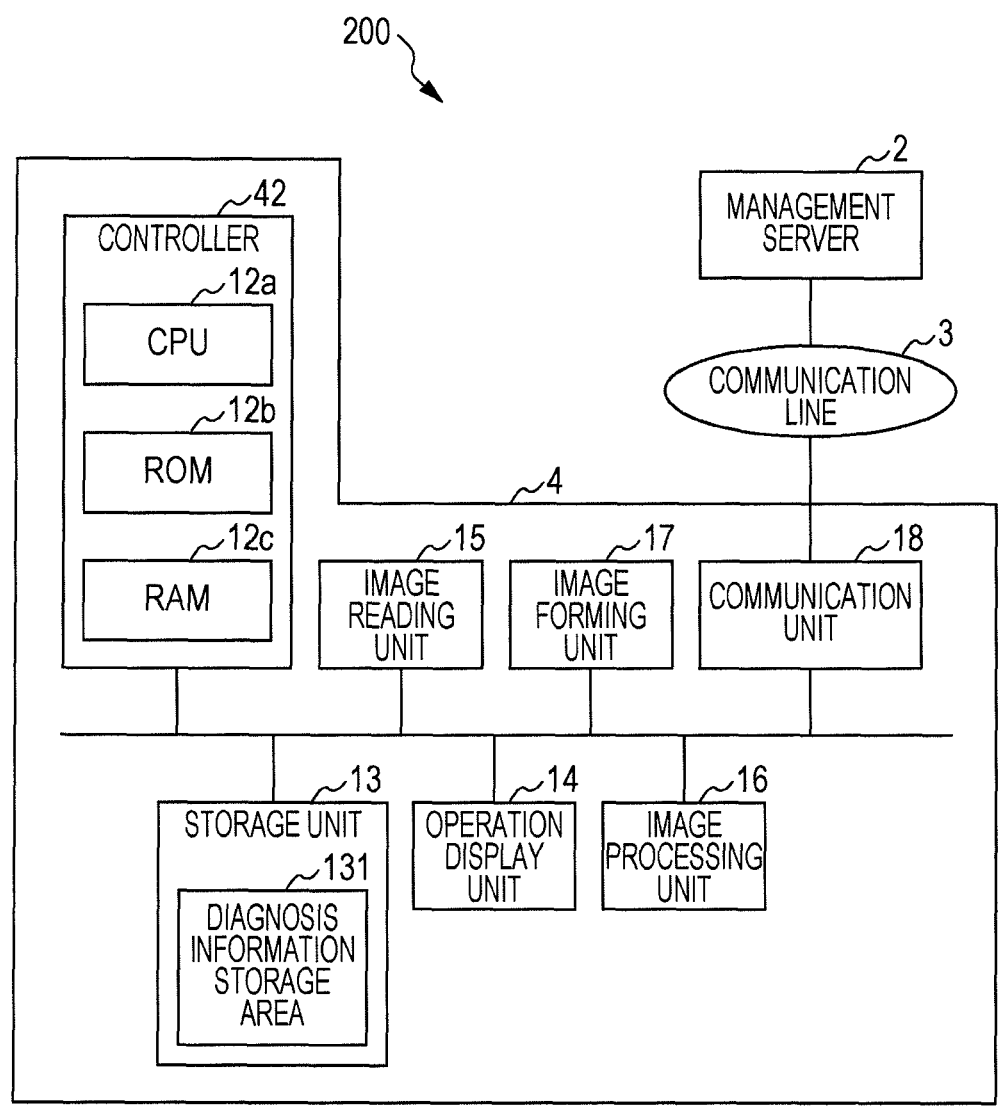
FIG. 8 is a block diagram illustrating an example of the configuration of a maintenance management system according to a second exemplary embodiment.

A second exemplary embodiment of the present invention is described next. FIG. 8 is a block diagram of an exemplary configuration of a maintenance management system 200 according to the second exemplary embodiment. In FIG. 8, the image forming apparatus 4 according to the second exemplary embodiment differs from the image forming apparatus 1 according to the first exemplary embodiment in terms of the process performed by a controller 42. The configuration of the maintenance management system 200 is the same as that of the maintenance management system 100 according to the first exemplary embodiment. Accordingly, the same numbering will be used in describing the components and the processes illustrated in FIG. 8 as was utilized above in describing the first exemplary embodiment and, therefore, descriptions of the components and the processes are not repeated.

Figure 9:
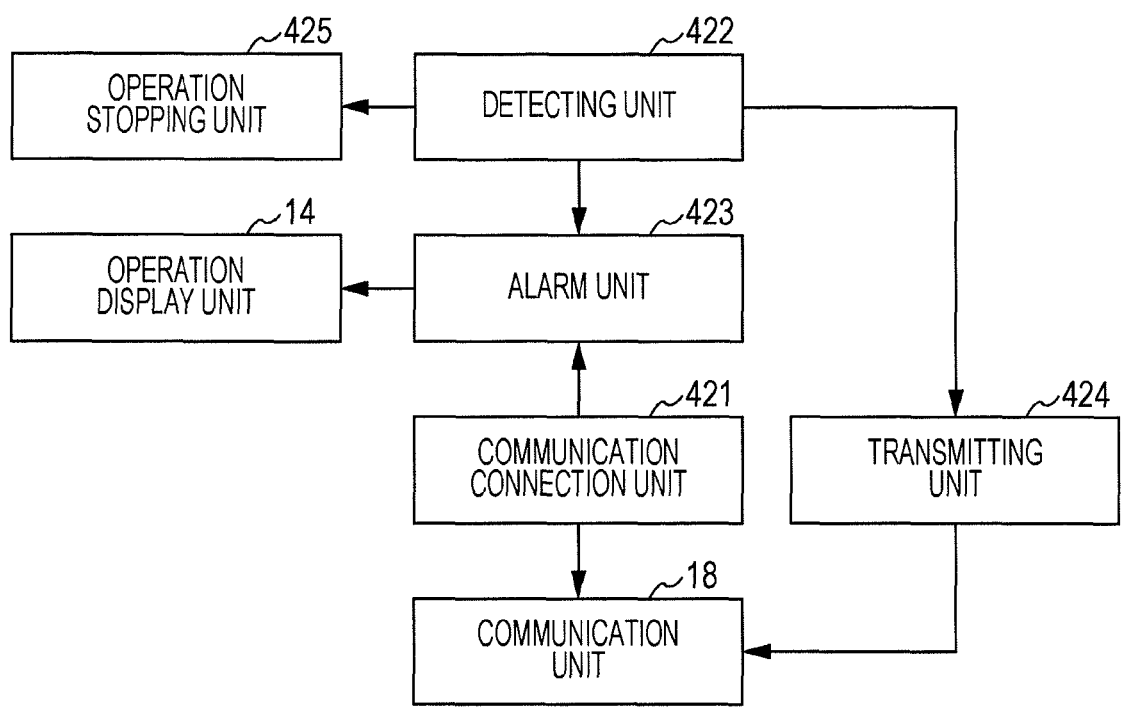
FIG. 9 is a block diagram of an exemplary functional configuration of an image forming apparatus.

FIG. 9 is a block diagram of an exemplary functional configuration of the image forming apparatus 4. As illustrated in FIG. 9, each of a communication connection unit 421, a detecting unit 422, an alarm unit 423, a transmitting unit 424, and an operation stopping unit 425 is realized by the controller 42 of the image forming apparatus 4 that reads the computer program stored in the ROM 12*b* or the storage unit 13 and executes the computer program. Note that an arrow in FIG. 9 schematically illustrates the flow of data. In FIG. 9, the communication connection unit 421 establishes a communication connection with a different apparatus via a communication line 3. The communication connection unit 421 is an example of a communication connection unit according to the present invention.

The detecting unit 422 detects the state in which the operation performed by the image forming unit 17 is likely to stop (hereinafter referred to as a "warning state") using a predetermined condition. The detecting unit 422 is an example of a detecting unit according to the present invention. The detecting unit 422 changes the detection condition in accordance with whether a communication connection is established or not. That is, in the case where a communication connection is not established, the warning state is detected earlier than in the case where a communication connection is established. The state in which the operation performed by the image forming unit 17 is likely to stop is a state in which the image forming process may not continue due to an excessive amount of operation performed by the image forming apparatus 4. Examples of such a state include the state in which the amount of remaining toner is smaller than or equal to a predetermined threshold value and a state in which the number of rotation of the photoconductor drum is larger than or equal to a predetermined threshold value. In addition, examples of the predetermined condition include a threshold value for the amount of remaining toner and a threshold value for the number of rotation of the photoconductor drum. Such a condition is used for determining whether the state in which the operation performed by the image forming apparatus 4 is likely to stop occurs.

If the detecting unit 422 detects some failure, the alarm unit 423 sends a message prompting a user to respond to the failure. The alarm unit 423 is an example of an alarm unit of the present invention. If a communication connection is established, the transmitting unit 424 transmits the information regarding the failure that is detected by the detecting unit 422 to a management server connected thereto via a communication line. The transmitting unit 424 is an example of a transmitting unit of the present invention. More specifically, for example, the transmitting unit 424 transmits the information indicating the amount of remaining toner at predetermined intervals.

If the failure detected by the detecting unit 422 is not satisfactorily corrected after a predetermined period of time has elapsed since the alarm unit 423 alerted the user, the operation stopping unit 425 stops the operation performed by all or some of the components of the image forming apparatus 4 related to the detected failure. The operation stopping unit 425 is an example of an operation stopping unit according to the present invention. More specifically, for example, the operation stopping unit 425 stops the image forming operation performed by the image forming apparatus 4 if the amount of remaining toner is zero or replacement of the photoconductor drum or a charging unit is necessary.

Figure 10:
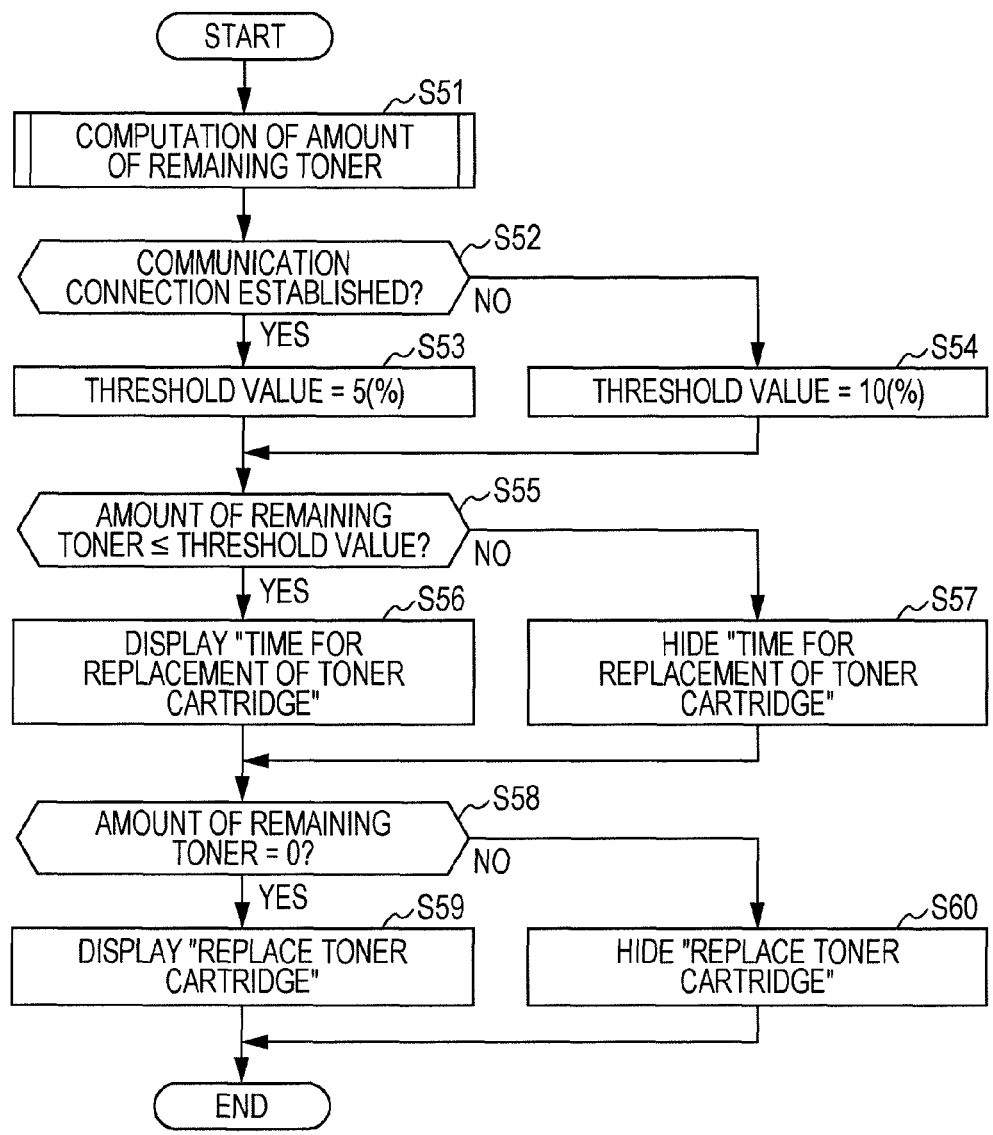
FIG. 10 is a flowchart of a process performed by a controller of the image forming apparatus.

FIG. 10 is a flowchart of an exemplary process performed by the controller 42 of the image forming apparatus 4 according to the present exemplary embodiment. In the example illustrated in FIG. 10, the controller 42 monitors the amount of remaining toner. If the amount of remaining toner is low, an alert process is performed. The process illustrated in FIG. 10 is performed at predetermined intervals (once every processing unit). As illustrated in FIG. 10, the controller 42 computes the amount of remaining toner first (step S51). The amount of remaining toner is computed through estimation based on the accumulated value of a toner supply time or the accumulated pixel count or using the measured value output from a sensor.

Subsequently, the controller 42 determines whether a communication connection is established for the image forming apparatus 4 (step S52). If a communication connection is established ("YES" in step S52), the controller 42 sets a threshold value to 5(%) (step S53). However, if a communication connection is not established ("NO" in step S52), the controller 42 sets the threshold value to 10(%) (step S54). Thereafter, the controller 42 determines whether the amount of toner computed in step S51 is lower than or equal to the threshold value (step S55). If the amount of toner computed in step S51 is lower than or equal to the threshold value ("YES" in step S55), the controller 42, for example, displays a message indicating that the toner cartridge is to be replaced on the operation display unit 14 (step S56). In this way, the controller 42 allows the user to be aware that the toner cartridge is to be replaced. However, if the amount of toner computed in step S51 is higher than the threshold value ("NO" in step S55), the controller 42 does not perform the alert process for informing that the toner cartridge is to be replaced (step S57). If, in step S57, a message indicating that the toner cartridge is to be replaced is displayed on the operation display unit 14, the controller 42 hides the message from the screen.

Subsequently, the controller 42 determines whether the amount of remaining toner is zero (step S58). If the amount of remaining toner is zero ("YES" in step S58), the controller 42, for example, displays a message indicating that the toner cartridge is to be immediately replaced on the operation display unit 14 (step S59). In this way, the controller 42 allows the user to be aware that the toner cartridge is to be immediately replaced. However, if the amount of remaining toner is not zero ("NO" in step S58), the controller 42 does not perform the alert process for informing that the toner cartridge is to be immediately replaced (step S60). If, in step S60, a message indicating that the toner cartridge is to be immediately replaced is displayed on the operation display unit 14, the controller 42 hides the message from the screen.

In the example illustrated in FIG. 10, when a communication connection is established, a message indicating that the toner cartridge is to be replaced is displayed if the amount of remaining toner is less than or equal to 5%. However, when a communication connection is not established, a message indicating that the toner cartridge is to be replaced is displayed if the amount of remaining toner is less than or equal to 10%. That is, if a communication connection is not established, the alert process is performed earlier than that performed when a communication connection is established. In this way, when a communication connection is not established, the interval between the times at which the message is displayed is longer than that when a communication connection is established.

When a communication connection is established, the server can be aware of the occurrence of a failure and the consumable status and, therefore, a maintenance technician can visit the user or the consumable can be delivered in accordance with the failure and the consumable status. However, when a communication connection is not established and even if the occurrence of a failure is detected or a message indicating that a consumable is to be replaced is received by the user, it is necessary for the user to notify the maintenance manager of the event. If the user does not notify the maintenance manager of the event, a maintenance technician does not visit the user or the consumable is not delivered. Accordingly, if the image forming apparatus stops shortly after the failure occurs or notification of a consumable to be replaced is received, it is difficult for the user to use the image forming apparatus. In contrast, according to the present exemplary embodiment, if a communication connection is not established, the alert process is performed earlier than in the case in which a communication connection is established so that the user rarely experience stoppage of the image forming apparatus.

While the process for monitoring the amount of remaining toner has been described with reference to the example illustrated in FIG. 10, the controller 42 may monitor another event. More specifically, if it is necessary to replace a part of the image forming apparatus, such as a photoconductive member by sometime soon, a message prompting the user to replace the part may be output early by decreasing the threshold values of the number of rotation, the rotation time, or the distance (the product of the number of rotation and the rotation time) to less than the threshold values set when a communication connection is established. Alternatively, a message prompting the user to replace the part may be output early by decreasing the threshold values of the number of printed sheets or the outputtable image density from the threshold values set when a communication connection is established.

Third Exemplary Embodiment

A third exemplary embodiment of the present invention is described next. An image forming apparatus according to the third exemplary embodiment differs from the image forming apparatus 4 according to the second exemplary embodiment in terms of the process performed by the detecting unit 422 and the process performed by the operation stopping unit 425. The other components and processes are the same as those of the image forming apparatus 4 according to the second exemplary embodiment. Accordingly, the same numbering will be used in describing the components and the processes below as was utilized above in describing the image forming apparatus 4 of the second exemplary embodiment and, therefore, descriptions of the components and the processes are not repeated.

A detecting unit 422 of the image forming apparatus 4 according to the present exemplary embodiment detects the state in which the image forming unit 17 is likely to stop using a predetermined condition. In the second exemplary embodiment described above, the condition used by the detecting unit 422 is changed in accordance with whether a communication connection is established. However, according to the present exemplary embodiment, the detecting unit 422 detects the state using the same condition regardless of whether a communication connection is established.

According to the present exemplary embodiment, if a failure detected by the detecting unit 422 is not corrected, the operation stopping unit 425 stops the operation performed by all or some of the components of the image forming apparatus 4 related to the detected failure. At that time, if a communication connection is established, the operation stopping unit 425 stops the operation performed by the image forming apparatus 4 after a first predetermined period of time has elapsed since the alarm unit 423 performed an alert process. However, if a communication connection is not established, the operation stopping unit 425 stops the operation performed by the image forming apparatus 4 after a second predetermined period of time has elapsed since the alarm unit 423 performed an alert process, where the second predetermined period of time is longer than the first predetermined period of time.

Figure 11:
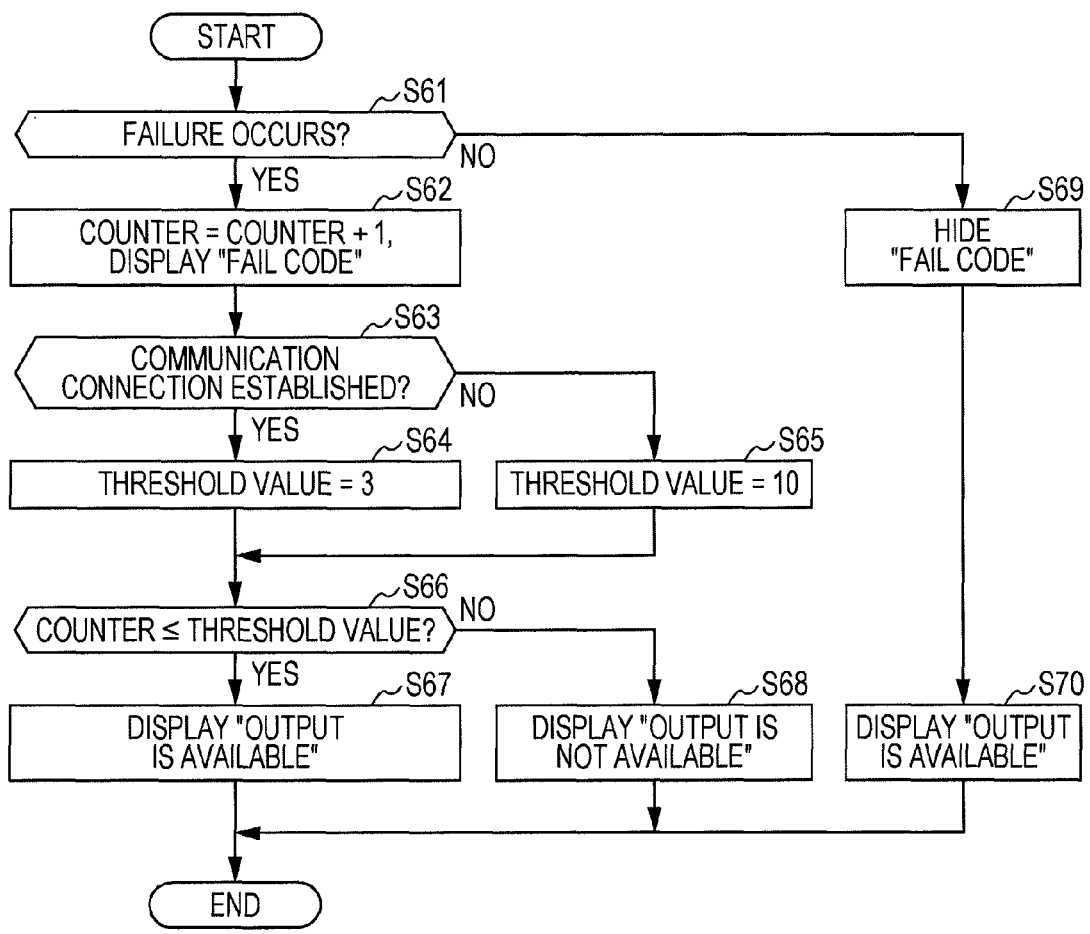
FIG. 11 is a flowchart of a process performed by the controller of the image forming apparatus.

FIG. 11 is a flowchart of an exemplary process performed by the controller 42 of the image forming apparatus 4 according to the present exemplary embodiment. In the example illustrated in FIG. 11, a message prompting the user to correct a failure or an alert in accordance with a result of detection performed by a toner density sensor. The controller 42 determines whether a failure occurs (step S61). If a failure occurs ("YES" in step S61), the controller 42 increments a counter by one. In addition, for example, the controller 42 displays, on the operation display unit 14, a message indicating that the toner density value is abnormal (e.g., "Fail code") so that the user is aware of the occurrence of the failure (step S62). Thereafter, the controller 42 determines whether a communication connection is established (step S63). If a communication connection is established ("YES" in step S63), the controller 42 sets a threshold value to "3" (step S64). However, if a communication connection is not established ("NO" in step S63), the controller 42 sets the threshold value to "10" (step S65).

Subsequently, the controller 42 determines whether the counter value is less than or equal to the threshold value (step S66). If the counter value is less than or equal to the threshold value ("YES" in step S66), the controller 42 displays, on the operation display unit 14, a message indicating that the result of the image forming process can be output (step S67). However, if, in step S66, the counter value is greater than the threshold value ("NO" in step S66), the controller 42 stops the image forming operation performed by the image forming apparatus 4 and displays, on the operation display unit 14, a message indicating that the result of the image forming process is not output (step S68). In contrast, if, in step S61, a failure does not occur ("NO" in step S61), the controller 42 does not display a message indicating that the toner density value is abnormal (i.e., does not perform an alert process) (step S69). The controller 42 displays, on the operation display unit 14, a message indicating that output of the result of the image forming process is available (step S70).

If a failure occurs, the image forming apparatus is stopped at a time when the failure occurs or after a predetermined number of sheets have been output since the failure occurred. However, some failures allow the image forming apparatus to output a few sheets even after the occurrence of the failure. In such a case, even after the operation performed by the image forming apparatus is stopped due to the occurrence of a failure, the user allows the image forming apparatus to output a few sheets or operate until a failure occurs again by resetting the failed state by powering on and off. When a communication connection is established and if a first failure occurs, the failure is notified to the management server. Thus, the occurrence of the failure is recognized and, therefore, a maintenance technician can visit the user or perform a remote maintenance operation on the image forming apparatus. In contrast, when a communication connection is not established and if a failure occurs, the user may continue to use the image forming apparatus, if possible, by, for example, powering on and off without reporting the occurrence of a failure to the maintenance manager. As a result, the image forming apparatus may stop its operation, and it may be difficult for the user to use the image forming apparatus. However, according to the present exemplary embodiment, when a communication connection is not established, the image forming apparatus is stopped later than it is stopped when a communication connection is established because the user may report the occurrence of a failure to the maintenance manager late.

Modifications

While the present invention has been described with reference to exemplary embodiments, the present invention is not limited thereto. A variety of other exemplary embodiments can be carried out. Such modifications are described below. Note that the following modifications may be appropriately combined in various ways.

(1) In the above-described first to third exemplary embodiments, even when a communication connection is established, it may be temporarily determined that a communication connection is not established due to an error in the communication line. In the above-described exemplary embodiments, the controller changes the process in accordance with whether a communication connection is established. However, even when a mode in which a communication connection is established is changed to a mode in which a communication connection is not established, the controller may perform a process for the mode in which a communication connection is established during a predetermined period of time or a predetermined number of times. That is, in the first exemplary embodiment, if a mode in which a communication connection is established is changed to a mode in which a communication connection is not established, the controller 12 may perform a storage control process that is performed when a communication connection is established for a predetermined period of time since communication was disconnected. In addition, in the second exemplary embodiment, if a mode in which a communication connection is established is changed to a mode in which a communication connection is not established, the controller 42 may perform a storage control process that is performed when a communication connection is established for a predetermined period of time since communication was disconnected. Furthermore, in the third exemplary embodiment, if the mode in which a communication connection is established is changed to the mode in which a communication connection is not established, the controller 42 may perform an operation stopping process for a mode in which a communication connection is established for a predetermined period of time since disconnection of the communication. Alternatively, in the first to third exemplary embodiments, if a result of determination as to whether a communication connection is established is not notified within a predetermined period of time, the controller may enter a mode in which a communication connection is not established and perform an operation for storing the diagnosis information.

(2) While the first exemplary embodiment has been described with reference to the examples 1 to 5 of the operation for reducing the data amount of the diagnosis information stored in the diagnosis information storage area 131 when a communication connection is not established, the operation for reducing the data amount of the diagnosis information is not limited thereto. For example, the controller 12 may statistically process the consumable information or the usage status information, and the stored information may be replaced with a result of the statistical process. That is, any operation of reducing the data amount of the diagnosis information performed by the controller 12 can be employed.

(3) In the first exemplary embodiment, the image forming apparatus 1 may be separated from the information processing apparatus that manages the diagnosis information regarding the image forming apparatus 1. In such a case, the image forming apparatus 1 can generate the diagnosis information, and the controller of the image processing apparatus can acquire the generated diagnosis information from the image forming apparatus 1. Similarly, in the second and third exemplary embodiments, the image forming apparatus 4 may be separated from the information processing apparatus that controls the operation performed by the image forming apparatus 4.

(4) While above exemplary embodiments have been described with reference to the process in which the controller 42 alerts a user by displaying a message on the operation display unit 14, the alert process is not limited thereto. For example, the controller 42 may alert a user by outputting a voice message or a beep sound. Alternatively, for example, the controller 42 may alert a user by illuminating a light source, such as an LED. Still alternatively, the controller 42 may alert a user by displaying the message and outputting the voice message. That is, any alert technique for alerting the user using the controller 42 of the image forming apparatus 4 can be employed.

(5) The program to be stored in the ROM 12b or the storage unit 13 can be stored in a computer-readable recording medium and be delivered. Examples of the computer-readable recording medium include a magnetic recording medium (e.g., a magnetic tape, a magnetic disk (a hard disk (HDD)), or a flexible disk (FD)), an optical recording medium (e.g., an optical disk), a magnetooptical recording medium, and a semiconductor memory. Alternatively, the program may be downloaded into the image forming apparatus 1 via a communication line, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an acquiring unit that acquires diagnosis information regarding an operating condition of an image forming apparatus that forms an image;
a communication connection unit that establishes a communication connection with the image forming apparatus and a management server via a communication line;
a storage controller that stores the diagnosis information acquired by the acquiring unit in a predetermined memory, the storage controller reducing a data amount of the diagnosis information stored when a communication connection is not established to less than a data amount of the diagnosis information stored when a communication connection is established; and a transmitting unit that transmits the diagnosis information stored in the memory to the management server if a communication connection is established by the communication connection unit.

2. The information processing apparatus according to claim 1, wherein if a communication connection is not established by the communication connection unit, the storage controller stores the diagnosis information in the memory less frequently than if a communication connection is established.

3. The information processing apparatus according to claim 2, wherein the diagnosis information includes an identifier, and wherein if a communication connection is not established by the communication connection unit, the storage controller counts how many times the diagnosis information is acquired by the acquiring unit for each of types of identifier, and wherein if the count for one of the types is less than a predetermined threshold value, the storage controller does not store, in the memory, the acquired diagnosis information of the type.

4. The information processing apparatus according to claim 1, wherein if a communication connection is not established by the communication connection unit, the storage controller counts a number of diagnosis information items acquired by the acquiring unit for each of types of identifier, and wherein if a number of acquired diagnosis information items having a same type is greater than or equal to a predetermined threshold value, the storage controller overwrites one of diagnosis information items stored in the memory with a newly acquired diagnosis information item having the same type.

5. The information processing apparatus according to claim 1, wherein if a communication connection is not established by the communication connection unit, the storage controller stores, in the memory, only a diagnosis information item including a predetermined identifier.

6. The information processing apparatus according to claim 1, wherein a diagnosis information item includes at least one parameter, and wherein if a communication connection is not established by the communication connection unit, the storage controller reduces a number of parameters of the diagnosis information item to be stored in the memory to less than a number of parameters set if a communication connection is established.

7. The information processing apparatus according to claim 1, wherein if a mode in which a communication connection is established is changed to a mode in which a communication connection is not established, the storage controller stores a diagnosis information item in the same manner as in the mode in which a communication connection is established for a predetermined period of time since the change in the mode of communication connection.

8. An information processing apparatus comprising:
a communication connection unit that establishes a communication connection with a management server via a communication line;
a detecting unit that detects a mode in which an image forming apparatus that forms an image is likely to stop using a predetermined detection condition, the detecting unit changing the detection condition in accordance with whether a communication connection is established so that, in the case where a communication connection is not established, the mode is detected earlier than in the case where a communication connection is established;
an alarm unit that outputs a message prompting a user to correct the mode if the detecting unit detects the mode;
a transmitting unit that transmits, to the management server, a result of detection performed by the detecting unit if a communication connection is established by the communication connection unit; and
an operation stopping unit that stops some or all of operations performed by the image forming apparatus if the mode detected by the detecting unit is not corrected even after a predetermined period of time has elapsed since the alarm unit output the message.

9. An image forming apparatus comprising:
a communication connection unit that establishes a communication connection with a management server via a communication line;
a detecting unit that detects a mode in which the image forming apparatus that forms an image is likely to stop using a predetermined detection condition;
an alarm unit that outputs a message prompting a user to correct the mode if the detecting unit detects the mode;
a transmitting unit that transmits, to the management server, a result of detection performed by the detecting unit if a communication connection is established by the communication connection unit; and
an operation stopping unit that stops some or all of operations performed by the image forming apparatus if the mode detected by the detecting unit is not corrected;
wherein if a communication connection is established by the communication connection unit, the operation stopping unit stops the operations after a first period of time has elapsed since the alarm unit output the message, and wherein if a communication connection is not established, the operation stopping unit stops the operations after a second period of time that is longer than the first period of time has elapsed since the alarm unit output the message.

10. A computer readable medium storing a program causing a computer to execute a process for processing information, the process comprising:
acquiring diagnosis information regarding an operating condition of an image forming apparatus that forms an image;
establishing a communication connection with the image forming apparatus and a management server via a communication line;
storing the acquired diagnosis information in a predetermined memory while reducing a data amount of the diagnosis information stored when a communication connection is not established to less than a data amount of the diagnosis information stored when a communication connection is established; and
transmitting the diagnosis information stored in the memory to the management server if a communication connection is established by the communication connection unit.

11. A computer readable medium storing a program causing a computer to execute a process for processing information, the process comprising:
establishing a communication connection with an image forming apparatus and a management server via a communication line;
detecting a mode in which the image forming apparatus that forms an image is likely to stop using a predetermined detection condition and changing the detection condition in accordance with whether a communication connection is established so that in the case where a communication connection is not established, the mode is detected earlier than in the case where a communication connection is established;
outputting a message prompting a user to correct the mode if the mode is detected;
transmitting a result of the detecting to the management server if a communication connection is established; and
stopping some or all of operations performed by the image forming apparatus if the detected mode is not corrected even after a predetermined period of time has elapsed since the outputting of the message.

12. A computer readable medium storing a program causing a computer to execute a process for forming an image, the process comprising:
establishing a communication connection with an image forming apparatus and a management server via a communication line;
detecting a mode in which the image forming apparatus that forms an image is likely to stop using a predetermined detection condition;
outputting a message prompting a user to correct the mode if the mode is detected;
transmitting a result of the detecting to a management server if a communication connection is established; and
stopping some or all of operations performed by the image forming apparatus if the detected mode is not corrected;
wherein if a communication connection is established, some or all of operations are stopped after a first period of time has elapsed since the outputting of the message, and wherein if a communication connection is not established, some or all of operations are stopped after a second period of time that is longer than the first period of time has elapsed since the outputting of the message.

13. An information processing method comprising:
acquiring diagnosis information regarding an operating condition of an image forming apparatus that forms an image;
establishing a communication connection with the image forming apparatus and a management server via a communication line;
storing the acquired diagnosis information in a predetermined memory while reducing a data amount of the diagnosis information stored when a communication connection is not established to less than a data amount of the diagnosis information stored when a communication connection is established; and
transmitting the diagnosis information stored in the memory to the management server if a communication connection is established.

14. An information processing method comprising:
establishing a communication connection with an image forming apparatus and a management server via a communication line;
detecting a mode in which the image forming apparatus that forms an image is likely to stop using a predetermined detection condition and changing the detection condition in accordance with whether a communication connection is established so that in the case where a communication connection is not established, the mode is detected earlier than in the case where a communication connection is established;
outputting a message prompting a user to correct the mode if the mode is detected;
transmitting a result of the detecting to the management server if a communication connection is established; and
stopping some or all of operations performed by the image forming apparatus if the detected mode is not corrected even after a predetermined period of time has elapsed since the outputting of the message.

15. An image forming method comprising:
establishing a communication connection with an image forming apparatus and a management server via a communication line;
detecting a mode in which the image forming apparatus that forms an image is likely to stop using a predetermined detection condition;
outputting a message prompting a user to correct the mode if the mode is detected;
transmitting a result of the detecting to a management server if a communication connection is established; and
stopping some or all of operations performed by the image forming apparatus if the detected mode is not corrected;
wherein if a communication connection is established, some or all of operations are stopped after a first period of time has elapsed since the outputting of the message, and wherein if a communication connection is not established, some or all of operations are stopped after a second period of time that is longer than the first period of time has elapsed since the outputting of the message.

* * * * *